Nov. 9, 1948.  A. R. CUNNINGHAM  2,453,500
VEHICLE CONSTRUCTION
Filed April 7, 1947  3 Sheets-Sheet 1

INVENTOR.
ARTHUR RAYMOND CUNNINGHAM
BY
ATTORNEYS

Nov. 9, 1948.　　　　A. R. CUNNINGHAM　　　　2,453,500
VEHICLE CONSTRUCTION

Filed April 7, 1947　　　　　　　　　　　　3 Sheets-Sheet 2

INVENTOR.
ARTHUR RAYMOND CUNNINGHAM
BY
Whittemore Hulbert & Belknap
ATTORNEYS

Nov. 9, 1948.  A. R. CUNNINGHAM  2,453,500
VEHICLE CONSTRUCTION
Filed April 7, 1947  3 Sheets-Sheet 3
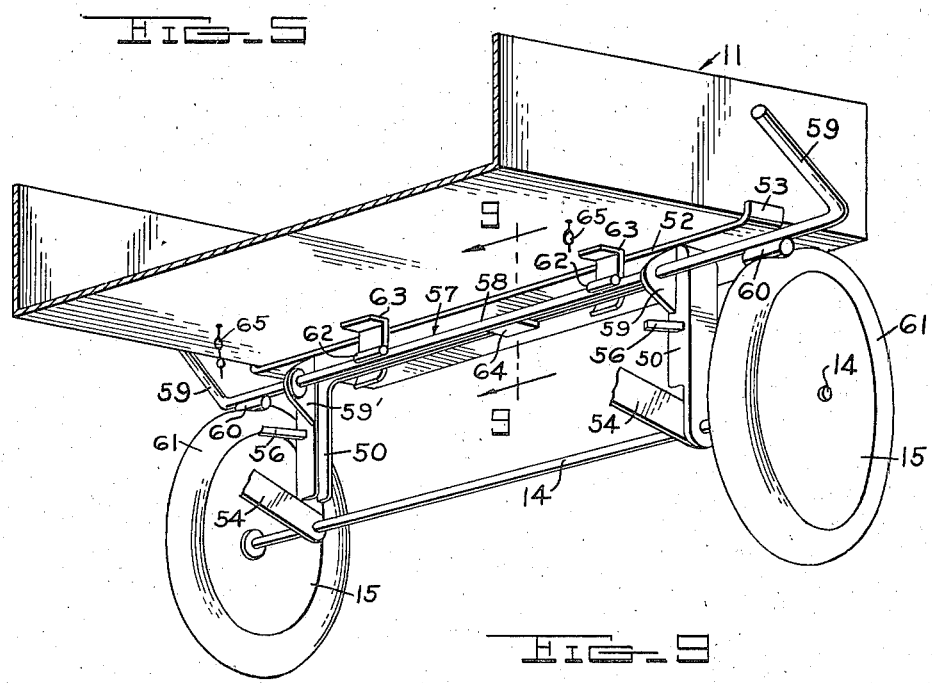
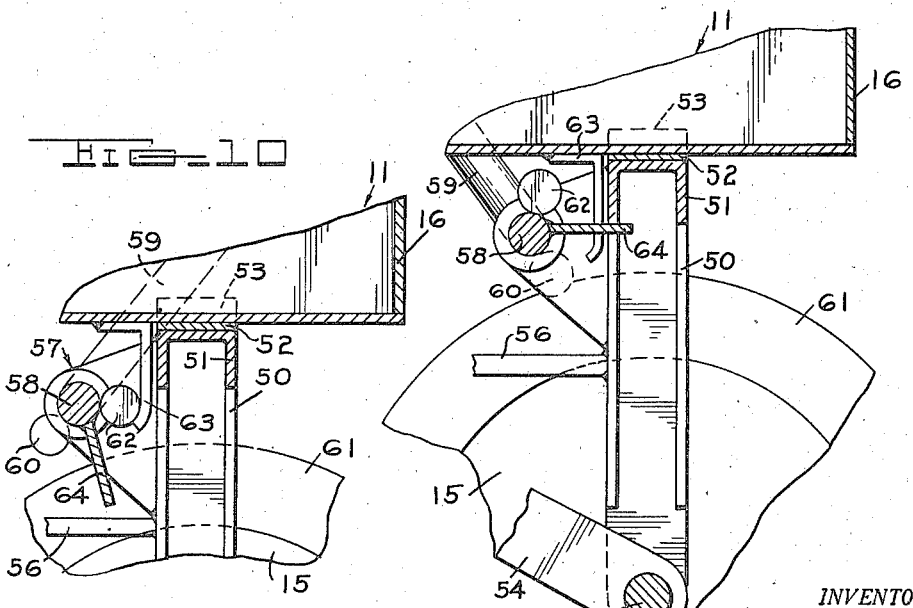
INVENTOR.
ARTHUR RAYMOND CUNNINGHAM
BY
ATTORNEYS Patented Nov. 9, 1948

2,453,500

UNITED STATES PATENT OFFICE 2,453,500

VEHICLE CONSTRUCTION

Arthur Raymond Cunningham, Detroit, Mich., assignor to Ray Cunningham and Sons, Inc., Detroit, Mich., a corporation of Michigan Application April 7, 1947, Serial No. 739,909

10 Claims. (Cl. 298—20)

This invention relates generally to vehicles and refers more particularly to wagons having improved means for tilting the wagon body at such an angle to enable a load on the body to be readily dumped.

One of the objects of this invention is to provide a wagon having simple, inexpensive means for raising the body and for tilting the latter about the rear axle to enable dispensing a load from the rear end of the body by the action of gravity.

Another object of this invention is to provide a connection between the body and rear axle responsive to rearward movement of the body and front axle relative to the rear axle to raise the rear end of the body.

Still another object of this invention is to provide latch mechanism operable in one position to hold the rear wheels against rotation and operable in another position to release the wheels and engage the body to hold the latter in its normal horizontal position relative to the rear axle.

A further feature of this invention is to provide a connection between the front axle and body responsive to movement of the front ground engaging wheels in a direction toward the rear wheels to lift the front end of the body upwardly about the rear axle to such an extent that the load in the body is readily dispensed from the rear end of the body.

The foregoing as well as other objects will be made more apparent as this description proceeds, especially when considered in connection with the accompanying drawings, wherein:

Figure 5 is a fragmentary perspective view of a part of the vehicle;

Figure 6 is a sectional view taken on the line 6—6 of Figure 1;

Figure 7 is a fragmentary perspective view of another part of the vehicle;

Figure 8 is a sectional view taken on the line 8—8 of Figure 6;

Figure 9 is a sectional view taken on the line 9—9 of Figure 5; and

Figure 10 is a sectional view similar to Figure 9 showing the parts in a different position.

Figure 1:
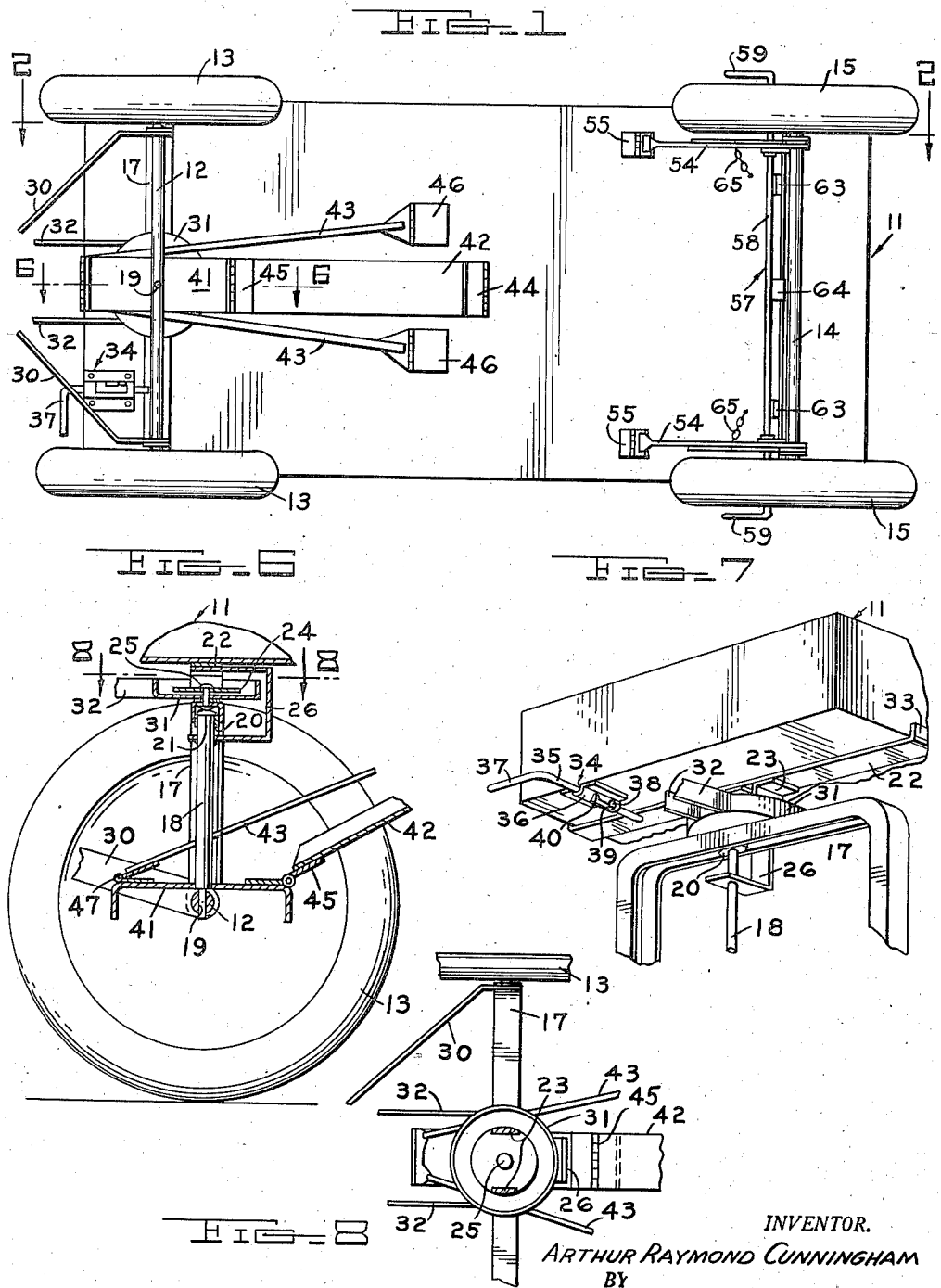
Figure 1 is a bottom plan view of a vehicle constructed in accordance with this invention.

The vehicle forming the subject matter of this invention is illustrated as being in the form of a wagon comprising a body 11, a front axle 12 having ground engaging wheels 13 suitably rotatably supported at opposite ends, and a rear axle 14 having ground engaging wheels 15 rotatably supported on opposite ends thereof. The body 11 may be formed of any suitable material, such for example, as wood or sheet metal, and is provided with a tail gate 16 at the rear end. The tail gate 16 is suitably hingedly supported at opposite ends to adjacent sides of the body to enable the same to be swung to its open position when desired.

Supported by the front axle 12 is an inverted substantially U-shaped brace 17 having a channel-shaped cross sectional area for strength purposes, and having aligned openings in the lower ends of the leg portions for receiving opposite ends of the axle 12. As shown in Figure 6 of the drawings, a vertical pin 18 extends between the axle 12 and the base portion of the U-shaped brace 17. In detail the lower end of the pin 18 is reduced and extends through an opening 19 formed in the axle 12 intermediate the ends of the latter. The upper end of the pin 18 is journalled in a bushing 20 welded or otherwise secured in the channel of the brace 17 intermediate the ends of the base portion of the brace. A head 21 is formed on the upper end of the pin 18 above the bushing 20, and cooperates with the latter to hold the pin in assembled relation with the brace 17.

As shown in Figures 6 to 8 inclusive, the brace 17 is connected to a body supporting member 22 by a U-shaped bracket 23 having the leg portions welded or otherwise secured to the member 22. The base portion 24 of the bracket 23 is connected to the brace 17 by a rivet or pin 25 positioned in vertical alignment with the pin 18. If desired the body supporting member 22 may also be connected to the upper end of the pin 18 by a U-shaped brace 26 having the top leg welded or otherwise secured to the member 22 and having the lower leg apertured to receive the pin 18. The lower leg of the brace 26 is welded to the pin and, as a result, the brace holds the member 22 in a fixed position during turning movement of the axle.

The above construction is such that the axle 12 and brace 17 may be turned in one direction or the other about the aligned axes of the pin 18 and rivet 25. This turning movement may be accomplished by a pull-bar 28 having a coupling 29 at the rear and respectively connected to opposite ends of the axle 12 by links 30. It will also be noted that the coupling 29 is connected to a disc 31 by arms 32. The disc 31 is shown in Figures 6 to 8 inclusive as pivoted on the brace 17 by the rivet or pin 25. Thus movement of the drawbar laterally in opposite directions effects a turning movement of the front axle 12 in corresponding directions.

The body supporting member 22 extends transversely of the body adjacent the front end of the latter and has a length approximating the width of the body. The opposite ends of the member 22 are bent upwardly to form flanges 33 for respectively engaging opposite sides of the body. As shown in Figure 7 of the drawings, the body 11 may be held against a displacement relative to the supporting member 22 by a latch 34 comprising a bolt 35 and a supporting bracket 36 for the bolt. The supporting bracket 36 is suitably secured to the bottom of the body in advance of the member 22, and the bolt 35 is supported in the bracket for both sliding movement and rotation relative thereto. The rear end of the bolt 35 is adapted to engage the underside of the member 22, and the front end of the bolt is provided with a hand grip 37. The rear end of the bolt is held in its latched position with respect to the member 22 by engagement of a pin 38 on the bolt in a recess 39 formed in the bracket 36. A similar recess 40 is formed in the bracket at the front side of the recess 39 for engagement with the projection 38 to hold the bolt in its released position with respect to the member 22. In this connection it will be noted that the two recesses are connected by a slot to provide clearance for the passage of the projection 38 when the bolt is moved into and out of its latched position.

Referring again to Figure 6 of the drawings, it will be noted that a plate 41 is welded or otherwise secured to the pin 18 immediately above the axle 12. The rear end of the plate is connected to the bottom of the body intermediate the ends of the latter by a link 42, and the front end of the plate is connected to the bottom of the body at opposite sides of the link 42 by links 43. The rear end of the link 42 is pivoted to the underside of the body by a hinge 44, and the front end of the link 42 is pivoted to the plate 41 by a hinge 45. The rear ends of the links 43 are respectively pivoted to the underside of the body at opposite sides of the link 42 by hinges 46, and the front ends of the links 43 are pivoted to the plate 41 by a hinge 47.

Figure 4:
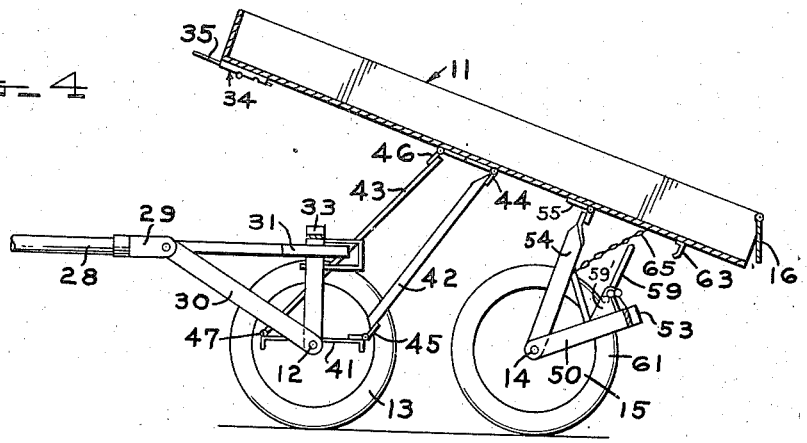
Figure 4 is also a longitudinal sectional view of the vehicle similar to Figure 2 showing the body in still another position.

As will be more fully hereinafter set forth, the purpose of the linkage connection between the plate 41 and the body 11 is to permit tilting or swinging the body in an upward direction about the rear axle 14. In this connection it will be noted from Figure 1 of the drawings that the relative positions of the hinges 44 and 46 are such as to permit tilting the body 11 to the position thereof shown in Figure 4 while maintaining the plate 41 in its normal horizontal plane. Thus the relative positions of the parts in the front end assembly are not appreciably affected by the tilting movement of the body.

The rear axle 14 is journalled at opposite ends in a pair of upwardly extending braces or arms 50 having the upper ends connected together by a downwardly opening channel-shaped cross member 51. A body supporting member 52 is welded or otherwise secured to the base of the channel member 51, and forms a seat for the rear end portion of the body 11. As shown particularly in Figure 5 of the drawings, the opposite ends of the member 52 project beyond the vertical braces 50 and are formed with upstanding flanges 53 for respectively engaging opposite sides of the body. The opposite end portions of the axle 14 are also respectively connected to the bottom of the body 11 in advance of the axle 14 by arms 54 having the lower ends pivoted to the axle 14 and having the upper ends connected to the body by hinges 55. The arms 54 are connected to the vertical braces 50 by suitable rods 56.

In the present instance provision is made for latching the vertical braces 50 to the ground engaging wheels 15 and for accomplishing this result releasable latch mechanism 57 is provided. The latch mechanism 57 comprises a rod 58 extending transversely of the body beneath the latter, and journalled in suitable brackets 59 respectively secured to the upper ends of the braces 50. The ends of the rod 58 extending beyond opposite sides of the body 11 and are bent laterally to provide gripping portions 59. Suitable latching elements 60 are secured to the rod 58 in positions to respectively engage the rim or tire portions 61 of the wheels 15 when the rod is rotated to its operative position shown in Figures 5 and 9 of the drawings. Additional latch elements 62 are secured to the rod 58 in positions to respectively engage suitable keepers 63 in the form of brackets welded or otherwise secured to the bottom of the body.

The annular relationship between the latch elements 60 and 62 is such that when the elements 60 are in operative or wedging engagement with the tires 61 on the wheels 15, the latch elements 62 are released from the keepers 63, as shown in Figure 9 of the drawings. Thus the rear end of the body is released from the body supporting member 52, and is free to be raised relative to this member. On the other hand, when the rod 58 is rocked or rotated in a direction to release the elements 60 from the wheels 15, the elements 62 engage the keepers 63 in the manner shown in Figure 10 of the drawings to latch or lock the body in seating engagement with the member 52.

In order to locate the latch elements 60 in locking relation to the tires 61 on the rear wheels 15, a stop 64 is secured to the rod 58 intermediate the ends thereof in a position to engage the underside of the channel member 51 when the elements 60 are swung to their latched positions shown in Figure 9 of the drawings. The construction is such that the stop 64 not only cooperates with the channel member 51 to position the elements 60 in latching relation to the wheels 15, but in addition, prevents movement of the latch elements 60 out of latching engagement with the rear wheels upon reverse rotation of the latter.

With the above in view, reference is now made more in detail to the operation of the wagon dumping mechanism described above. Assuming that the various parts are in their normal positions shown in Figure 2 of the drawings, and that it is desired to tilt the body 11 to its dumping position shown in Figure 4 of the drawings, the operator rotates the latch rod 58 in a direction to force the latch elements 60 into wedging engagement with the tires 61 on the rear wheels 15. During this rocking movement of the latch rod 58, the elements 62 are moved out of engagement with the keepers 63, and the member 64 is swung to its upper position in engagement with the underside of the cross member 51. In other words the latch rod 58 is swung from the released position thereof shown in Figure 10 to the operative position shown in Figure 9.

The operator then releases the latch 34 from the body supporting member 22 at the front end of the vehicle, and exerts a rearward force on the pull bar 28. As a result the rear wheels 15 are rotated in a reverse direction, and the braces or arms 50 are swung rearwardly about the axle 14.

Figure 3:
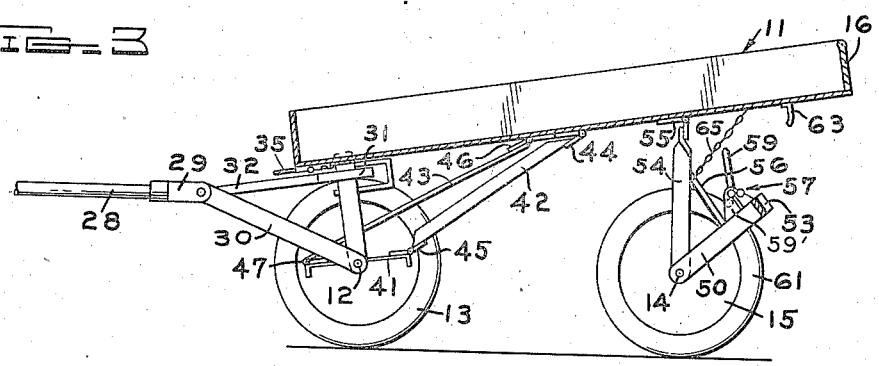
Figure 3 is a longitudinal sectional view similar to Figure 2 showing the body in a different position.

Due to the connection 56 between the arms 50 and arms 54, the latter are swung to the vertical position shown in Figure 3, and the parts are held in this position by means of suitable chains 65 having the lower ends connected to the links 56 and having the upper ends connected to the body. It follows from the above that the rear end of the body is raised relative to the axle 14 a distance depending upon the length of the arms 54.

Continued rearward movement of the draw-bar 28 effects a movement of the front wheels 13 toward the rear wheels 15 and raises the front end of the body relative to the supporting member 22. Due to the links 42 and 43, the body is swung upwardly about the rear axle 14 to the position shown in Figure 4 of the drawings, and the load in the body falls by gravity out of the rear end of the body.

Figure 2:
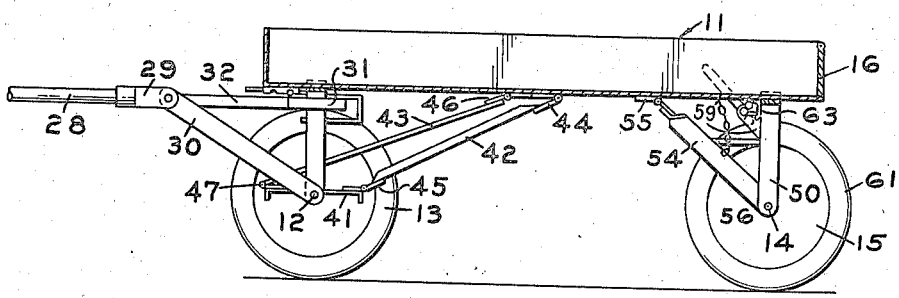
Figure 2 is a longitudinal sectional view taken substantially on the line 2—2 of Figure 1.

When it is desired to return the body to its normal horizontal position shown in Figure 2 of the drawings, the operator applies a forward pull on the bar 28 returning the front wheels 13 to their forwardmost position, and lowering the front end of the body in engagement with the supporting member 22. A forward pull is then also applied to the rear axle 14 tending to rotate the wheels 15 in a forward direction. This rotative force applied to the rear wheels exerts a cam action on the latch elements 60 and serves to rotate the rod 58 in a direction to release the elements 60 from the wheels 15. As the rear wheels are rotated in a forward direction, the arms 50 are swung upwardly and the arms 54 are swung downwardly to lower the rear end of the body on to the supporting member 52. The operator then manipulates the rod 58 to position the latch elements 62 in engagement with the keepers 63 to clamp the rear end of the body against the supporting member 52. The latch 34 may then be operated to lock the front end of the body in engagement with the supporting member 22, and the vehicle is in condition for normal operation.

What I claim as my invention is:

1. A vehicle comprising a body, an axle having ground engaging wheels thereon, a pair of arms having the lower ends supported on the axle for swinging movement about the axis of the axle, a member at the upper end of one arm removably engageable with the body to support the latter on the axle, means pivotally connecting the upper end of the second arm to the body in advance of the member, a connection between the arms responsive to shifting movement of the body in one direction relative to the axle to swing the arms about the axle and raise the body, and means responsive to continued shifting movement of the body in the above direction to swing the body about the axle.

2. A vehicle comprising a body, an axle having ground engaging wheels thereon, a pair of arms having the lower ends supported on the axle for swinging movement about the axis of the axle, a member at the upper end of one arm removably engageable with the body to support the latter on the axle, means pivotally connecting the upper end of the second arm to the body at a point spaced from the member lengthwise of the body, and releasable latch means operable to hold the ground engaging wheels against rotation whereby shifting movement of the body in one direction relative to the axle swings the second arm upwardly about the axle and raises the body off the member carried by the first arm.

3. A vehicle comprising a body, an axle having ground engaging wheels thereon, means for supporting the body on the axle including an arm having the lower end pivoted on the axle for swinging movement about the axis of the latter, a member carried by the upper end of the arm and removably engageable with the body to provide a seat for the latter, a second arm having one end pivoted to the axle for swinging movement and having the opposite end pivoted to the body at a point spaced from the member lengthwise of the body, a connection between the first and second arms, and releasable latch means carried by the first arm and engageable with the rim portion of one ground engaging wheel to swing the arms about the axle in response to movement of the vehicle in one direction and thereby raise the body.

4. A vehicle comprising a body, an axle having ground engaging wheels thereon, means for supporting the body on the axle including an arm having the lower end pivoted on the axle for swinging movement about the axis of the latter, a member carried by the upper end of the arm and removably engageable with the body to provide a seat for the latter, a second arm having the lower end pivoted to the axle for swinging movement about said axle and having the upper end pivoted to the body in advance of the axle, a connection between the first and second arms, a releasable latch means carried by the first arm and engageable with the rim portion of one ground engaging wheel to swing the arms about the axle in response to reverse rotation of the ground engaging wheels and thereby raise the body, and means operated by the latch means in the released position of the latter to latch the body in seating engagement with said member.

5. A vehicle comprising a body, an axle having ground engaging wheels thereon, means for supporting the body on the axle including an arm having the lower end pivoted on the axle for swinging movement about the axis of the latter, a member carried by the upper end of the arm and removably engageable with the body to provide a seat for the latter, a second arm having the lower end pivoted to the axle for swinging movement about said axle and having the upper end pivoted to the body in advance of the axle, a connection between the first and second arms, a releasable latch means carried by the first arm and engageable with the rim portion of one ground engaging wheel to swing the arms about the axle in response to reverse rotation of the ground engaging wheels and thereby raise the end of the body adjacent said axle, and supporting means for the opposite end of the body movable toward the axle for tilting the body upwardly about the axle.

6. A vehicle comprising a body, front and rear axles having ground engaging wheels thereon, means supporting the body on the rear axle including a member extending transversely of the body and removably engageable with the underside of the body, a pair of arms having the lower ends respectively mounted on the rear axle adjacent opposite ends thereof for swinging movement about the rear axle and having the upper ends connected to said member, a second pair of arms having the lower ends respectively mounted on the rear axle adjacent the first arms for swinging movement about the rear axle and having the upper ends pivoted to the body in advance of the rear axle, a connection between the arms of each pair, selectively operable means for latching the first pair of arms to the ground engaging wheels on the rear axle to thereby raise the rear end of the body upon reverse rotation of the rear wheels, and means for limiting the extent of reverse rotation of the rear wheels to locate the rear end of the body in its elevated position.

7. A vehicle comprising a body, an axle having ground engaging wheels thereon, means for supporting the body on the axle including an arm having the lower end pivoted on the axle for swinging movement about the axis of the latter, a member carried by the upper end of the arm and removably engageable with the body to provide a seat for the latter, a second arm having the lower end pivoted to the axle for swinging movement about said axle and having the upper end pivoted to the body in advance of the axle, a connection between the first and second arms, a releasable latch means carried by the first arm and engageable with the rim portion of one ground engaging wheel to swing the arms about the axle in response to reverse rotation of the ground engaging wheels and thereby raise the body, and means for clamping the body to the supporting member releasable from the latter upon movement of the latch means into engagement with said ground engaging wheel.

8. A vehicle comprising a body, front and rear axles having ground engaging wheels thereon, means supporting the body on the rear axle including a member extending transversely of the body and removably engageable with the underside of the body, a pair of arms having the lower ends respectively mounted on the rear and adjacent opposite ends thereof for swinging movement about the rear axle and having the upper ends connected to said member, a second pair of arms having the lower ends respectively mounted on the rear axle adjacent the first arms for swinging movement about the rear axle and having the upper ends pivoted to the body in advance of the rear axle, a connection between the arms of each pair, selectively operable means for latching the first pair of arms to the ground engaging wheels on the rear axle to thereby raise the rear end of the body upon reverse rotation of the rear wheels, and means for swinging the front end of the body upwardly about the rear axle.

9. A vehicle comprising a body, front and rear axles having ground engaging wheels thereon, supporting structure for the front axle forming a rest for the front end of the body, means supporting the rear end of the body on the rear axle for swinging movement about the latter axle, selectively operable means for holding the rear wheels against reverse rotation, and means for raising the front end of the body about the rear axle in response to movement of the front axle in a direction toward the rear axle.

10. A vehicle comprising a body, a rear axle having ground engaging wheels, means supporting the rear end of the body on the rear axle for swinging movement about the latter, a front axle having ground engaging wheels and having supporting structure providing a rest for the front end of the body, said front axle and associated supporting structure being movable relative to the body toward and away from the rear axle, selectively operable means for holding the ground engaging wheels on the rear axle against reverse rotation, and means responsive to rearward movement of the front axle to swing the front end of the body upwardly about the rear axle.

ARTHUR RAYMOND CUNNINGHAM.

REFERENCES CITED

The following references are of record in the file of this patent:

UNITED STATES PATENTS

| Number | Name | Date |
|---|---|---|
| 1,400,752 | Land | Dec. 20, 1921 |

FOREIGN PATENTS

| Number | Country | Date |
|---|---|---|
| 340,375 | France | Feb. 11, 1904 |